Patented June 14, 1938

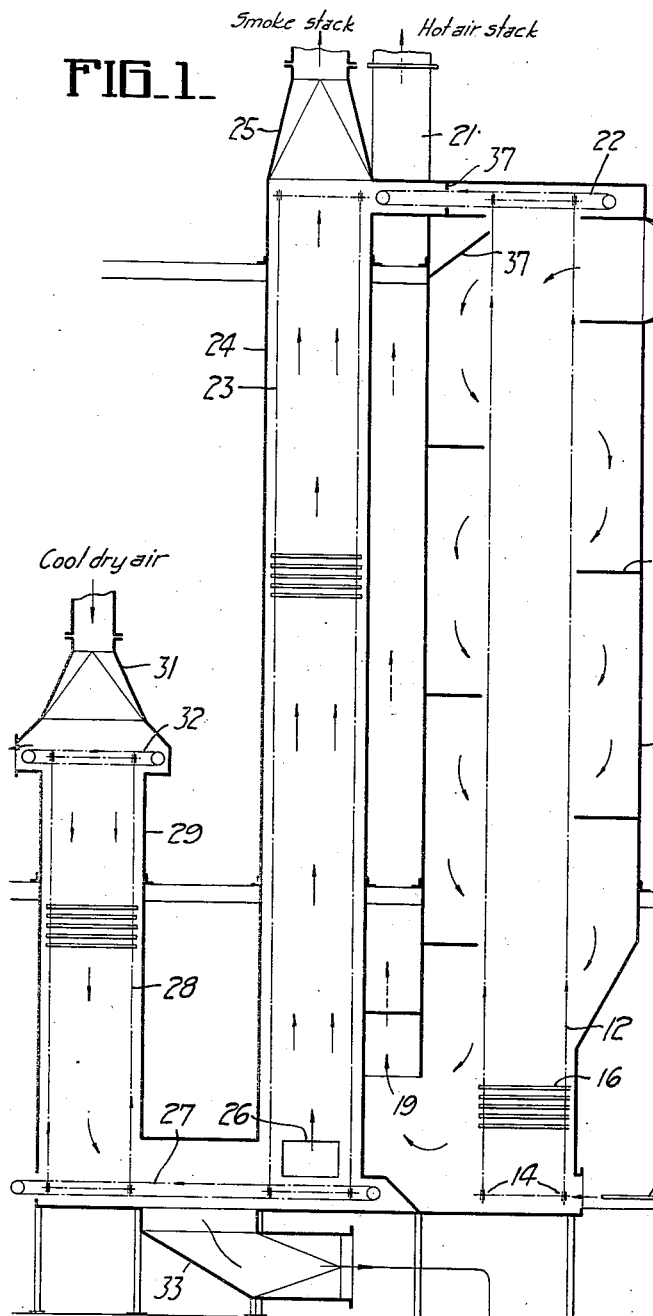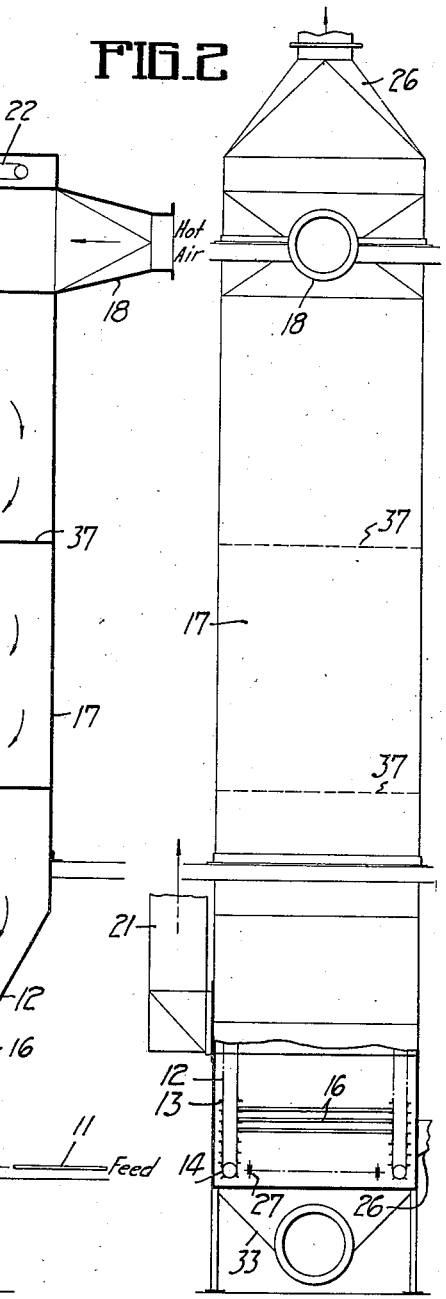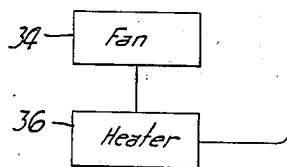

2,120,237

UNITED STATES PATENT OFFICE 2,120,237

TREATING FISH AND PRODUCT THEREOF

Maurice L. Brenner and Victor Schwab, Monterey, Calif., assignors to Sea Pride Packing Corp., Ltd., a corporation of California Application January 22, 1936, Serial No. 60,230

2 Claims. (Cl. 99—158)

The present invention relates to a new fish product, particularly a fish fillet which has been partially dried and then smoked and to a method for producing this product. Products along that line contemplated by the present invention have been heretofore attempted; however, such products have not been successfully achieved at a price acceptable to commercial operation. For example, within our long experience in the fish business, the production of a dried, smoked fillet has been attempted by a process wherein a drying and smoking of the fillet was attempted. However, the process was so conducted that the resultant product was unsatisfactory in that the cost was excessive, the product was not stable while the individual fillets tended to adhere to each other and were not firm, while the fillet left an oily after-taste.

It is a discovery of our invention that the oily after-taste is due to fat in the fish which becomes rancid. The process of the present invention provides for the drying and smoking of the fish in such a manner that the product does not leave the oily after-taste so undesirable and objectionable to the consumer while it is firm, stable and tasty.

In accordance with the present invention, we have also been able to dry and smoke the fish in such a manner that the natural glues present in the fish were so altered that their adhering power was destroyed and the fillets could be successfully packaged, the individual fillets not adhering to each other or to the package.

It is the further discovery of our invention that the drying and smoking of fish should be conducted in a particular manner. In fact, we prefer to first partially dry and then, while it is still warm, smoke the fish, and the process of our invention involves utilization of certain steps to be hereinafter disclosed.

It is in general an object of the present invention to provide for the production of a new fish product, particularly a dried and smoked fish fillet manufactured from such a fish as the sardine found on the west coast, particularly at Monterey, California.

Another object of the present invention is to provide a novel process for the treatment of a fish fillet.

A further object of the present invention is to provide an apparatus for the treatment of fish fillet, to the end that the fillets can be dried and smoked to give a stable fillet with a smoke flavor.

A further object of the present invention is to provide a process for the production of a fish fillet which is characterized in that the fillet does not leave an oily after-taste when eaten.

The invention possesses numerous other objects and features of advantage, some of which, together with the foregoing, will appear hereinafter, wherein we have disclosed the present preferred form of our invention.

In the drawing:

Figure 1 is a side elevation, partly in section, through an apparatus utilized in connection with the present invention; and Figure 2 is an end elevation, partly cut away to illustrate a conveyor structure employed.

In accordance with this invention, the fish fillets, after being prepared in a manner well known in the art, are laid in single layers upon suitable wire trays. These trays are then placed upon a suitable conveyor structure to carry the fish through various treatments. As appears in Figure 2, the conveyors are made up by extending parallel chains 12 carrying angles 13 about sprockets 14, the sprockets being driven by suitable power means. As appears in Figure 1, the trays are first set on an upwardly traveling conveyor 16 adjacent the bottom of the apparatus. The conveyor is surrounded by a metal shell 17 having an inlet adjacent the top thereof as at 18 and an outlet at 19 connected to stack 21. Conveyor 16 delivers the trays to a transverse conveyor 22. This conveyor transfers the trays from conveyor 22 to a downwardly extending conveyor 23, the transfer being effected by means well known in the art which forms no part of the present invention per se. Conveyor 23 is likewise surrounded by a chamber provided by walls 24 connected to a stack 25. Chamber 24 is provided with an inlet 26.

Trays reaching the bottom of chamber 24 on conveyor 23, are transferred by transverse conveyor 27 to a second upwardly extending conveyor 28. Transverse conveyor 27 is like transverse conveyor 22. Conveyor 28 extends upwardly in a chamber provided by walls 29. An intake 31 is provided for the chamber while a discharge conveyor 32 serves to remove the trays from the conveyor 28 after the fish fillets have been dried and smoked.

In accordance with this invention, the drying and smoking of the fish fillets is conducted preferably in a particular manner. Briefly, the process consists in subjecting the fish fillets to a drying medium to remove a goodly portion of the moisture and thereafter subjecting the dried and warm fish fillets to a concentrated atmosphere of smoke after which the fillets are cooled and the excess smoke constituents largely removed. In the apparatus disclosed, this is particularly effected by drawing in cold dry air through the intake 31 over the advancing conveyor 28. The cold dry air, in contact with the dried and smoked fillets, removes from these any excess of smoke constituents present.

The air is withdrawn from the chamber provided by walls 29 through a conduit 33 and into a heater 36, a fan 34 providing the means for moving the air stream. The hot air from the heater then passes into intake 18. The hot air is forced downwardly, counter-current to the ascending conveyor 16 and the fillets thereon, the air being directed to circulate down the chamber and back and forth by baffles 37. If desired, fan 34 can be provided so as to draw the air through the first chamber, the fan 34 being used to exhaust stack 21 or the fan can be connected at the bottom of the first chamber.

In this treatment of the fresh fillet it is to be remarked that the counter-current principle is employed, the hottest and driest air being contacted with the hottest and driest fish so that a thorough drying is secured. We have found that by gradually raising the temperature and increasing the relative degree of desiccation to which the fish is subjected, improved drying can be secured while the oil content is so treated that the product does not leave an oily after taste.

The measure of improved drying is according to two different standards. The first of these is, of course, the actual decrease in the moisture content of the fish, while the second is the effect upon the physical structure of the fish. Thus many prior art processes have been provided for the drying of fish, but it has been our experience that these usually resulted in the oil in the fish leaving an after-taste of fishy oil. By successively increasing the relative degree of heat and desiccation and then smoking, we are able to substantially eliminate this undesirable after-taste.

The hot air discharged into inlet 18 circulates, as before mentioned, downwardly over the ascending column of fish fillets, the hot air being discharged through stack 21 or otherwise disposed of. By using a descending column, proper draft or circulation conditions can be maintained in the chamber 17 because the column of descending air is constantly decreasing in temperature and in weight because it is picking up moisture.

The dry but still warm fish is discharged by the transverse conveyor 22 into the smoke chamber provided by walls 24. In this smoke chamber the dried fish is further partially dried, although the primary purpose of the treatment herein is to subject the fish to an increasing concentration of smoke. In this chamber direct impregnation of the smoke in the fish fillets takes place. The smoke is provided by any suitable means, although we prefer to use that from manzanita wood and tan bark combustion.

The treatment in the smoke chamber is such that the fillets are slightly over-smoked and their taste and flavor is then too strong. However, by the treatment with the cold, dry air in chamber 29, a reduction of this smoke content is secured which results in a very nicely flavored fish fillet.

The time of treatment can be varied somewhat, but we have found that with an incoming air temperature in inlet 18 of about 110° F., a treatment time of about an hour and five minutes suffices in the first chamber and, with a like temperature in the smoke chamber, a comparable length of time. About thirty minutes time is allowed in the final chamber. The temperature in the first chamber and in the smoke chamber is preferably 110° F. although some flexibility is possible and we have used temperatures between 100°–130° F. and as high as 140° F. successfully. We prefer 110° F.–115° F. as this temperature gives the best result in the apparatus disclosed.

While hereinbefore we have mentioned that we passed the hot air countercurrent to the cold fish fillets, we have used parallel flow conditions successfully and we therefore do not broadly wish to exclude such an operation. However, better results are secured by the counterflow of air and fish fillets.

We claim:

1. A process for producing smoked fish fillets from which a substantial percentage of the moisture has been removed and in which fat cells in each fillet are substantially intact, said process including the successive steps of passing cold air over hot and substantially dried and over-smoked fillets to cool said fillets and reduce said over-smoked condition and impart a smoked content to said cold air, heating said cold air having a smoke content to a fish fillet drying temperature, e. g. 110° F., passing said heated air having said smoke content over fresh cold fillets to dry said fillets, and raise the temperature thereof, passing smoke over the hot dry fillets until said fillets are over-smoked.

2. A process for producing smoked fish fillets from which a substantial percentage of the moisture has been removed and in which fat cells in each fillet are substantially intact, said process including maintenance of three successive treatment zones including first, a drying zone in which hot dry air from the third zone, at a fillet drying temperature, is passed over fresh fillets, second, a smoking zone in which dry fillets from the first zone are substantially over-smoked, and, third, a cooling zone in which the smoked dry fillets are cooled and the over-smoked condition corrected and a smoke content imparted to the air for utilization in the first zone when said air is heated.

MAURICE L. BRENNER.
VICTOR SCHWAB.